(No Model.)
H. CARMICHAEL.
LAST.
No. 460,067. Patented Sept. 22, 1891.
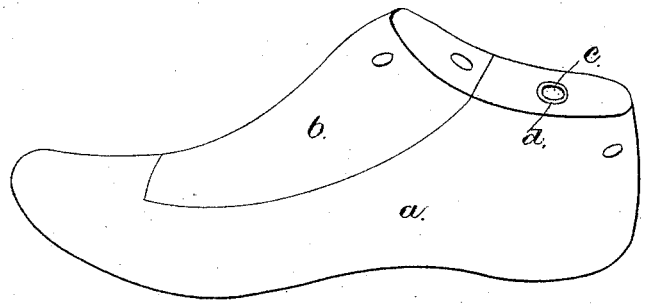
Witnesses.
Edgar A. Goddu
Frederick L. Emery
Inventor:
Henry Carmichael,
by Crosby & Gregory
Attys.

UNITED STATES PATENT OFFICE.

HENRY CARMICHAEL, OF MALDEN, MASSACHUSETTS, ASSIGNOR TO THE UNITED INDURATED FIBRE COMPANY, OF PORTLAND, MAINE.

LAST.

SPECIFICATION forming part of Letters Patent No. 460,067, dated September 22, 1891.

Application filed March 12, 1890. Serial No. 343,609. (No model.)

*To all whom it may concern:*

Be it known that I, HENRY CARMICHAEL, of Malden, county of Middlesex, State of Massachusetts, have invented an Improvement in Indurated Wood-Pulp Lasts, of which the following description, in connection with the accompanying drawing, is a specification, like letters on the drawing representing like parts.

Lasts commonly employed in the manufacture of boots and shoes are made from maple blocks, which blocks have to be well seasoned, the seasoning requiring a long period of time for the reason that if the seasoning is hastened by artificial means the wood cracks or splits, rendering the block useless. It is becoming quite difficult to obtain maple blocks, and very considerable capital is required to keep them in stock for the necessary time required in order that they may be thoroughly seasoned, and considerable space is required for their storing. Wood lasts, although commonly used, are objectionable because they vary in width, due not only to hygrometric changes but also to moisture contained in the shoe-uppers, and also wooden lasts frequently split, due both to internal stress and to external pressure or blows, and wooden lasts or forms employed in the production of rubber goods where the rubber compound is cured upon the last at high heat are speedily destroyed by the expansion and contraction of the wood, and lasts used for rubber goods gradually become carbonized by reason of the high heat to which they are subjected.

My invention has for its object to provide a last or form of homogeneous structure and possessing great strength and toughness, accompanied by lightness, a last or form which will retain its ultimate shape notwithstanding its exposure to heat or moisture, and which is adapted for use in the manufacture of boots and shoes of all sorts of material. I have by experiment produced such a last or form from a wood-pulp body toughened and hardened by induration, the small fibers of wood pulp being uniformly interlocked in the body made therefrom as contradistinguished from building up a body from thick or plastic pulp or by usual papier-maché processes.

In accordance with my invention I prepare a suitable mold having a reticulated surface for drainage, as in the manufacture of articles from pulp, and into this mold I feed wood pulp in a thin or fluid state, and by pressure or suction, or both, I express or remove the water, causing the pulp fibers to be deposited in such manner as to interlace one with another, the pulp-body being solidified in a mass which approximates (more or less) the shape desired for the finished article to be made therefrom. The body made by pressure, as stated, will be placed in a lathe of usual construction and turned to give to it the shape required for the last or form, and the surface of the last, after having been turned, will preferably be abraded and made smooth and true.

A last made from a wood-pulp body without induration would not have sufficient strength to withstand the strains and usages to which lasts are subjected, and therefore to give to the fibrous body and last or form the necessary strength, resistance, and fixedness as regards expansion and contraction, due to usual heat and moisture attendant upon the manufacture of boots and shoes, I indurate the wood-pulp body. A last or form composed of pulp indurated, as described, has a hard moisture-proof exterior shell and a softer porous inside or heart, for as the original moisture in the pulp is dried out the heart of the form is left sufficiently spongy, so as not to be thrown out of shape by the heat to which it may be exposed. The spongy heart or interior will not take heat in the same way as though the material at the center of the form was more dense, and hence such a form is especially adapted for work in which the last is subjected to high heat, as in rubber work, for which my last has been used. The induration makes the exposed parts or edges of the last or form tough and hard, so that the material will not chip off, break, or be destroyed by rough handling, as when dumped from a basket into a bin. By indurating and hardening the shell or exterior of the form and leaving the heart spongy or imperfectly filled with the indurated compound the form is left very much lighter, so that female help can be employed to good advantage rather than men, which latter class of help are employed when iron or large-sized wooden forms are used.

The complete induration takes effect in the pulp for from three-eighths to one-half inch, more or less, leaving a hard shell cushioned, however, internally by a somewhat spongy heart, which so supports the exterior that it will not crack or split by heat or any usual blows which would break a wooden last. The interior of the pulp being left spongy or porous is a great non-conductor of heat and prevents the last from becoming superheated and thereby destroyed, and it has been demonstrated by actual use that the indurated-pulp last—a last of the kind described—owing to its being thoroughly a non-conductor of heat, will cool much quicker than a wooden last of the same dimensions, which is important in the manufacture of rubber boots and shoes, as the lasts must be thoroughly cool before they are again used after having been drawn from a boot or shoe. This induration of the body may take place before or after the same has had given to it its ultimate shape—that is to say, the rough block or blank formed by deposition of the fiber, as described, may be indurated before it is turned or after it has been turned, but preferably after. This induration is effected by the employment of an oxidizable material or substance introduced in a fluid state into the wood-pulp body, the said material being thereafter hardened by exposure to heat and air. This oxidizable material may be linseed or other drying oil, among which I class cotton-seed oil and colophony or other resin or gum or mixture thereof. If linseed-oil is employed, it may have colophony incorporated with it, and the dry body or last will be immersed in a heated mixture thereof until a sufficient penetration of the body or last has taken place, when the last will be removed to a baking-oven and left therein exposed to heat and air until the oil and colophony are thoroughly hardened, or the mixture of linseed-oil and colophony may be dissolved in naphtha or other equivalent solvent, which will be introduced into the fibrous mass at ordinary temperatures and be followed by an evaporation of the solvent and baking in an oven, as before described.

During the process of hardening the last it may be immersed a greater or less number of times in the thickened linseed-oil or equivalent material and returned to the oven until the last receives a coating of hard and impermeable material.

By the term "last" I mean to include any usual block or form commonly employed to distend or keep in proper shape during its manufacture any usual foot-covering—as, for instance, a tree.

The figure shows a last embodying my invention.

Referring to the drawing, $a$ represents a last, and $b$ its usual top piece. This top piece may be separated from the last by any usual straight or curved cut, or it may be integral with the last, as desired. The last shown in the figure has a hole at $c$, which may, if desired, be lined in any usual manner, as common in wood lasts, by a metal sleeve $d$.

I am aware that lasts have been made from paper wound layer on layer and from papier-maché; but I am not aware prior to my invention that a last was ever made from a body produced from thin wood pulp with the fiber uniformly interlocked therein to thus insure a homogeneous body, and indurated, hardened, and toughened, as herein described. I may indurate the wood fiber in any usual manner.

I claim—

A last or form composed of pulp indurated and hardened and toughened externally and left spongy internally to thus constitute a cushion inside the hard but tough exterior, as and for the purposes described.

In testimony whereof I have signed my name to this specification in the presence of two subscribing witnesses.

HENRY CARMICHAEL.

Witnesses:
JAS. H. CHURCHILL,
FREDERICK L. EMERY.